United States Patent
Le Graverand et al.

(10) Patent No.: US 7,155,634 B1
(45) Date of Patent: Dec. 26, 2006

(54) PROCESS FOR GENERATING AND RECONSTRUCTING VARIABLE NUMBER OF PARITY FOR BYTE STREAMS INDEPENDENT OF HOST BLOCK SIZE

(75) Inventors: Philippe Y. Le Graverand, Saint Lys (FR); Jacques Debiez, Cugnaux (FR); Gerald O'Nions, Toulouse (FR); Charles A. Milligan, Golden, CO (US); James P. Hughes, Minneapolis, MN (US); Christophe Carret, Toulouse (FR)

(73) Assignee: Storage Technology Corporation, Louisville, CO (US)

( * ) Notice: Subject to any disclaimer, the term of this patent is extended or adjusted under 35 U.S.C. 154(b) by 462 days.

(21) Appl. No.: 10/280,426

(22) Filed: Oct. 25, 2002

(51) Int. Cl.
*G06F 11/00* (2006.01)
(52) U.S. Cl. .............................. 714/6; 714/804; 711/114
(58) Field of Classification Search ..................... 714/6; 711/114
See application file for complete search history.

(56) References Cited

U.S. PATENT DOCUMENTS

| | | | | |
|---|---|---|---|---|
| 4,205,324 A | * | 5/1980 | Patel | 714/804 |
| 4,771,458 A | * | 9/1988 | Citta et al. | 380/239 |
| 6,289,415 B1 | * | 9/2001 | Johnson | 711/111 |
| 6,529,997 B1 | * | 3/2003 | Debiez et al. | 711/114 |
| 6,581,185 B1 | * | 6/2003 | Hughes | 714/804 |
| 6,848,022 B1 | * | 1/2005 | Nanda | 711/114 |
| 2002/0095616 A1 | * | 7/2002 | Busser | 714/8 |
| 2004/0205387 A1 | * | 10/2004 | Kleiman et al. | 714/6 |

OTHER PUBLICATIONS

Patel, Arvind M. "Adaptive cross-parity (AXP) code for a high-density magnetic tape subsystem." IBM J. Res. Develop. vol. 29, No. 6, Nov. 1985, pp. 546-562.*
"Counter-intuitive RAID Rebuild Algorithm for Virtual Tape Server." IBM Technical Disclosure Bulletin, Oct. 2001, UK.*

* cited by examiner

*Primary Examiner*—Robert Beausoliel
*Assistant Examiner*—Phillip Guyton
(74) *Attorney, Agent, or Firm*—Brooks Kushman P.C.

(57) ABSTRACT

A method, system and program for generating parity in a data storage system are provided. The invention comprises organizing an incoming data block into a specified number of data stripes and cascading the data stripes into a parity creation mechanism. The parity creation mechanism creates a specified number of parity stripes based on the data stripes, wherein the number of parity stripes is independent of the size of the data block. The parity creation mechanism can operate offline to reconstruct lost data stripes and parity stripes without using critical system resources, wherein the number of devices required for stripe reconstruction is less than the combined number of data stripes and parity stripes.

7 Claims, 10 Drawing Sheets

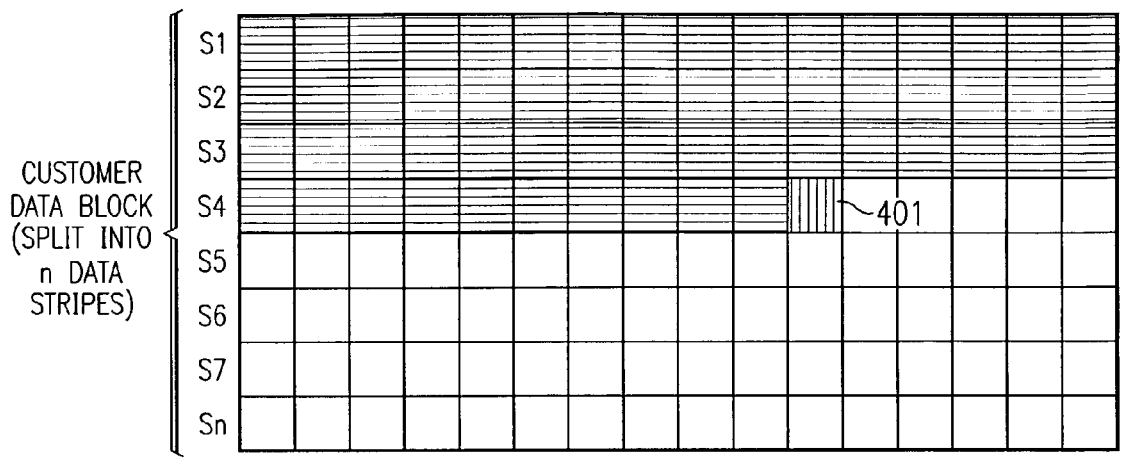

1ST STEP:
READ (AND STORE) THE
FULL CUSTOMER DATA
BLOCK (THE n STRIPES)

☐ UNREAD OR UNCOMPUTED DATA
☰ DATA ALREADY READ, AND PHYSICALLY STORED
⦀ INCOMING DATA
▨ $P_{+1}$ POSITIVE DIAGONAL PARITY (FINAL VALUE)
▨ $P_0$ STRAIGHT PARITY (FINAL VALUE)
▨ $P_{-1}$ NEGATIVE DIAGONAL PARITY (FINAL VALUE)

*FIG. 4A*

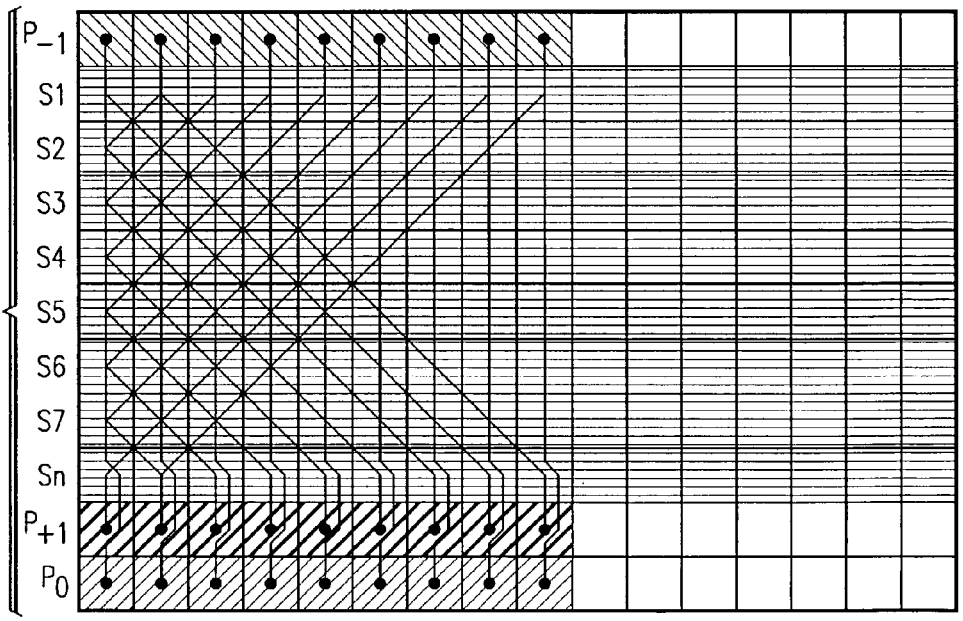

2ND STEP:
COMPUTE THE
p PARITIES

☐ UNREAD OR UNCOMPUTED DATA
☰ DATA ALREADY READ, AND PHYSICALLY STORED
⦀ INCOMING DATA
▨ $P_{+1}$ POSITIVE DIAGONAL PARITY (FINAL VALUE)
▨ $P_0$ STRAIGHT PARITY (FINAL VALUE)
▨ $P_{-1}$ NEGATIVE DIAGONAL PARITY (FINAL VALUE)

*FIG. 4B*

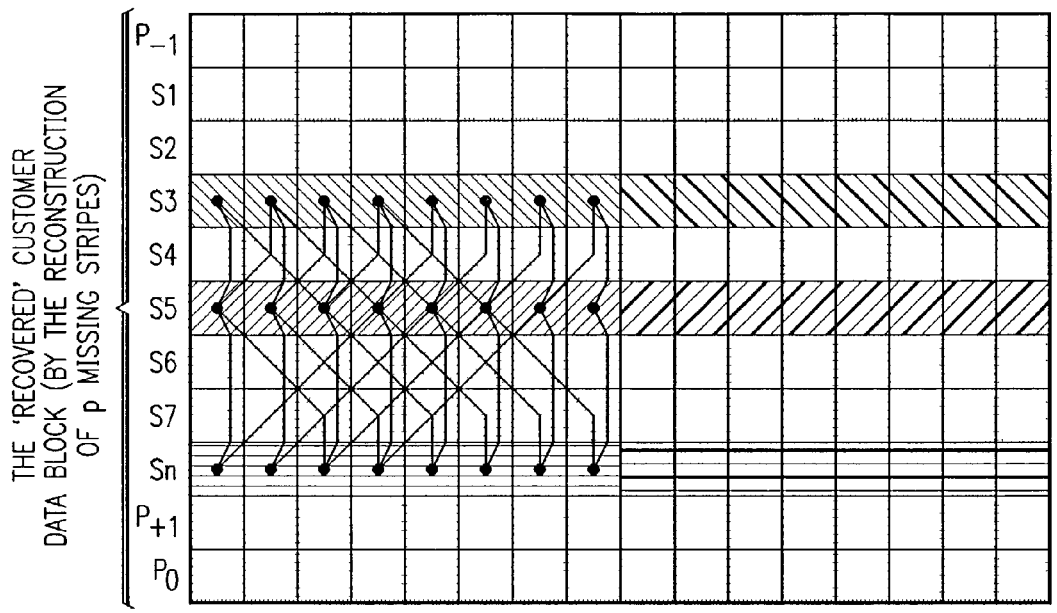

FIG. 7B

2ND STEP:
FINISH RECONSTRUCTION OF THE p MISSING STRIPES (EITHER DATA OR PARITIES) BY A SINGLE FINAL PASS

☒ MISSING STRIPES
☐ UNREAD OR UNCOMPUTED DATA
☐ STRIPES ALREADY READ, NOT STORED BUT THROWN AWAY
⊞ INCOMING DATA
☰ STRIPE RECONSTRUCTED VIA $P_{+1}$ (INTERMEDIATE VALUE)
▨ STRIPE RECONSTRUCTED VIA $P_0$ (INTERMEDIATE VALUE)
◩ STRIPE RECONSTRUCTED VIA $P_{-1}$ (INTERMEDIATE VALUE)
☰ STRIPE RECONSTRUCTED VIA $P_{+1}$ (FINAL VALUE)
▨ STRIPE RECONSTRUCTED VIA $P_0$ (FINAL VALUE)
◩ STRIPE RECONSTRUCTED VIA $P_{-1}$ (FINAL VALUE)

PROCESS FOR GENERATING AND RECONSTRUCTING VARIABLE NUMBER OF PARITY FOR BYTE STREAMS INDEPENDENT OF HOST BLOCK SIZE

BACKGROUND OF THE INVENTION

1. Field of the Invention

The present invention relates in general to RAID and RAIT systems, and more specifically to improving performance in virtualized RAID and RAIT systems.

2. Background of the Invention

Many systems use concepts such as Redundant Arrays of Independent Tapes (or Disks) (RAIT/RAID), comprising multiple physical resources allocated to enhance system performance or reliability. RAIT(D) comprises a set of two or more ordinary hard tapes/disks and a specialized disk controller that contains the RAIT(D) functionality. RAIT(D) improves performance by disk striping, which interleaves bytes or groups of bytes across multiple tapes/drives, so more than one tape/disk is reading and writing simultaneously. Fault tolerance is achieved by means of mirroring or parity. Mirroring comprises 100% duplication of the data on two drives (RAIT(D) 1). Parity is used (RAIT(D) 3 and 5) to calculate the data in two drives and store the results on a third. A bit from drive 1 is XOR'd with a bit from drive 2, and the result bit is stored on drive 3. A failed drive can be hot swapped with a new one, and the RAIT(D) controller automatically rebuilds the lost data.

Increasingly, data storage involves the use of computer systems via network connections. The use of storage that has been mapped into a different presentation from that available directly from the storage devices is known as storage virtualization. It is important to have the ability to manipulate the functions and structures that create and define a virtual volume, in order to have independence between the boundaries of individual blocks written by the host system and the boundaries of physical entities used for striping and parity.

Current data storage systems do not support the ability to set the level of striping and redundancy arbitrarily large or small for specific data files on a file-by-file basis. Arbitrarily large redundancy, when combined with arbitrarily large striping, generally imposes a large buffering requirement on the processing system. If the system uses small blocks of data for iterations of the process, the performance of the memory bus is adversely affected. This does not support the ability to experience a physical device failure and continue processing a file.

Correcting multiple errors that occur simultaneously is time consuming and significantly reduces system performance. Correction of errors offline requires the full set of striping and redundancy resources to be allocated for the process. Solving these limitations will advance the state of the art in virtualized storage systems.

SUMMARY OF THE INVENTION

The present invention provides a method, system and program for generating parity in a data storage system. The invention comprises organizing an incoming data block into a specified number of data stripes and cascading the data stripes into a parity creation mechanism. The parity creation mechanism creates a specified number of parity stripes based on the data stripes, wherein the number of parity stripes is independent of the size of the data block. The parity creation mechanism can operate offline to reconstruct lost data stripes and parity stripes without using critical system resources, wherein the number of devices required for stripe reconstruction is less than the combined number of data stripes and parity stripes.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 4a and 4B depict diagrams illustrating a method of parity generation in accordance with the present invention;

FIGS. 7A and 7B, diagrams illustrating an alternate method of data stripe reconstruction are depicted in accordance with a preferred embodiment of the present invention.

DETAILED DESCRIPTION OF THE PREFERRED EMBODIMENT

Figure 1:
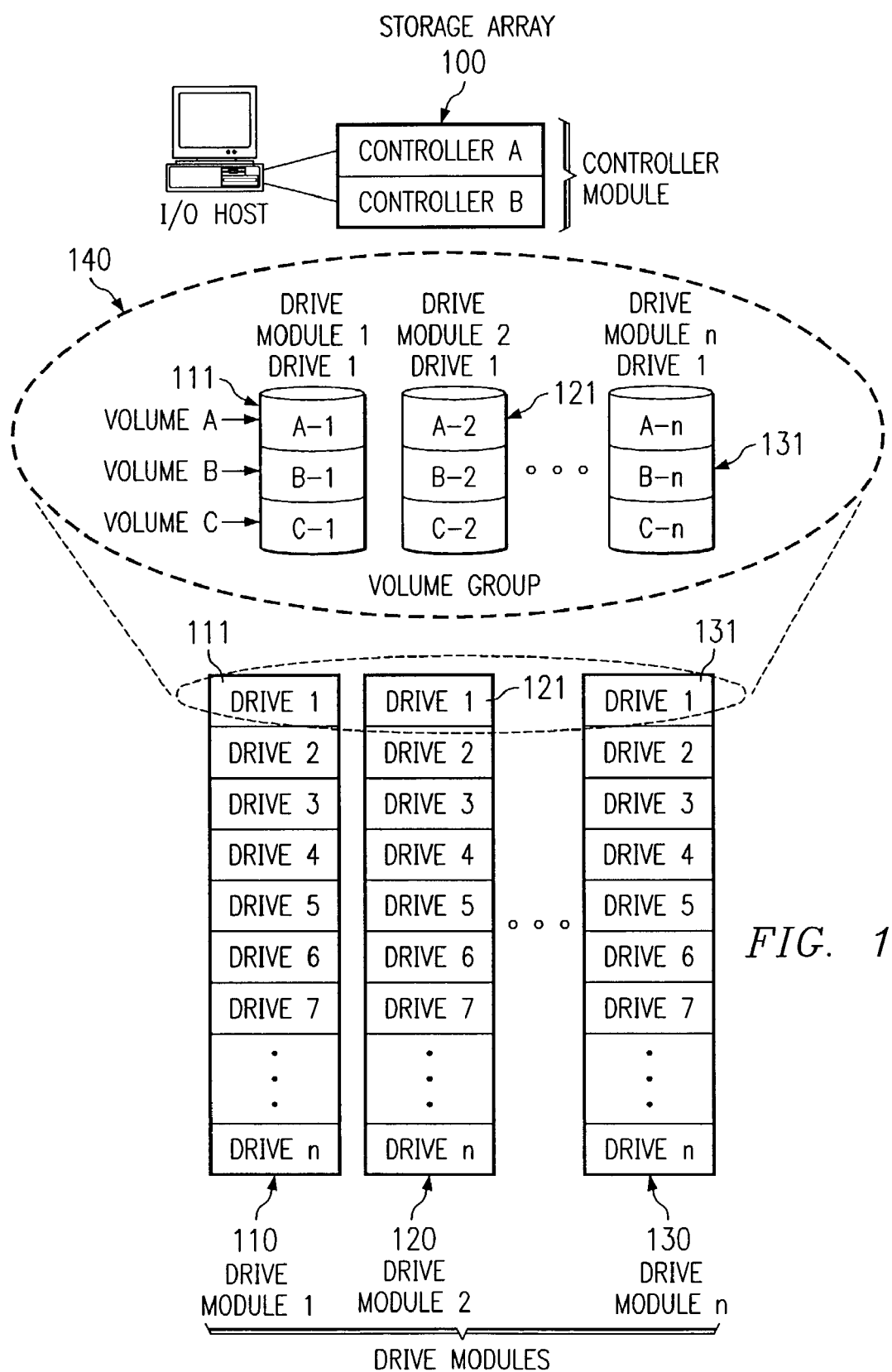
FIG. 1 depicts a diagram illustrating a RAID system volume group containing multiple volumes, in which the present invention may be implemented.

With reference now to the figures and in particular with reference to FIG. 1, a diagram illustrating a RAID system volume group containing multiple volumes, in which the present invention may be implemented. The following description refers specifically to a RAID example but applies equally to RAIT systems or a combination of disks and tapes.

The RAID storage system 100, is divided into multiple (n) drive modules 1 (110) through n (130), each of which in turn comprises multiple (n) storage drives. Users can create volumes for physical data storage across a collection of drives. For example, in FIG. 1, the data in volume A is divided into n sections (n being equal to the number of drive modules) and each section is stored on the first respective drive in each drive module. Therefore, section A-1 is stored on Drive 1 (111) in Module 1 (110), section A-2 is stored on Drive 1 (121) in Module 2 (120), and section A-n is stored on Drive 1 (131) in Module n (130).

Furthermore, multiple volumes created on the same set of drives (e.g., the first respective drives in each module) are grouped into an entity called a volume group. In FIG. 1, volume group 140 comprises three volumes A, B and C. Building on the example above, sections A-1, B-1, and C-1 are stored on Drive 1 (111) in Module 1 (110), sections A-2, B-2, and C-2 are stored on Drive 1 (121) in Module 2 (120), etc. As a further example, a second volume group, e.g., volumes D, E and F, might be stored on the second respective drives in each module.

The volume group 140 is assigned a specific RAID level by the user, which defines how the data will be striped across the set of drives and what kind of redundancy scheme is used. Any remaining capacity on a volume group can be used to create additional volumes or expand the capacity of the existing volumes.

Figure 2:
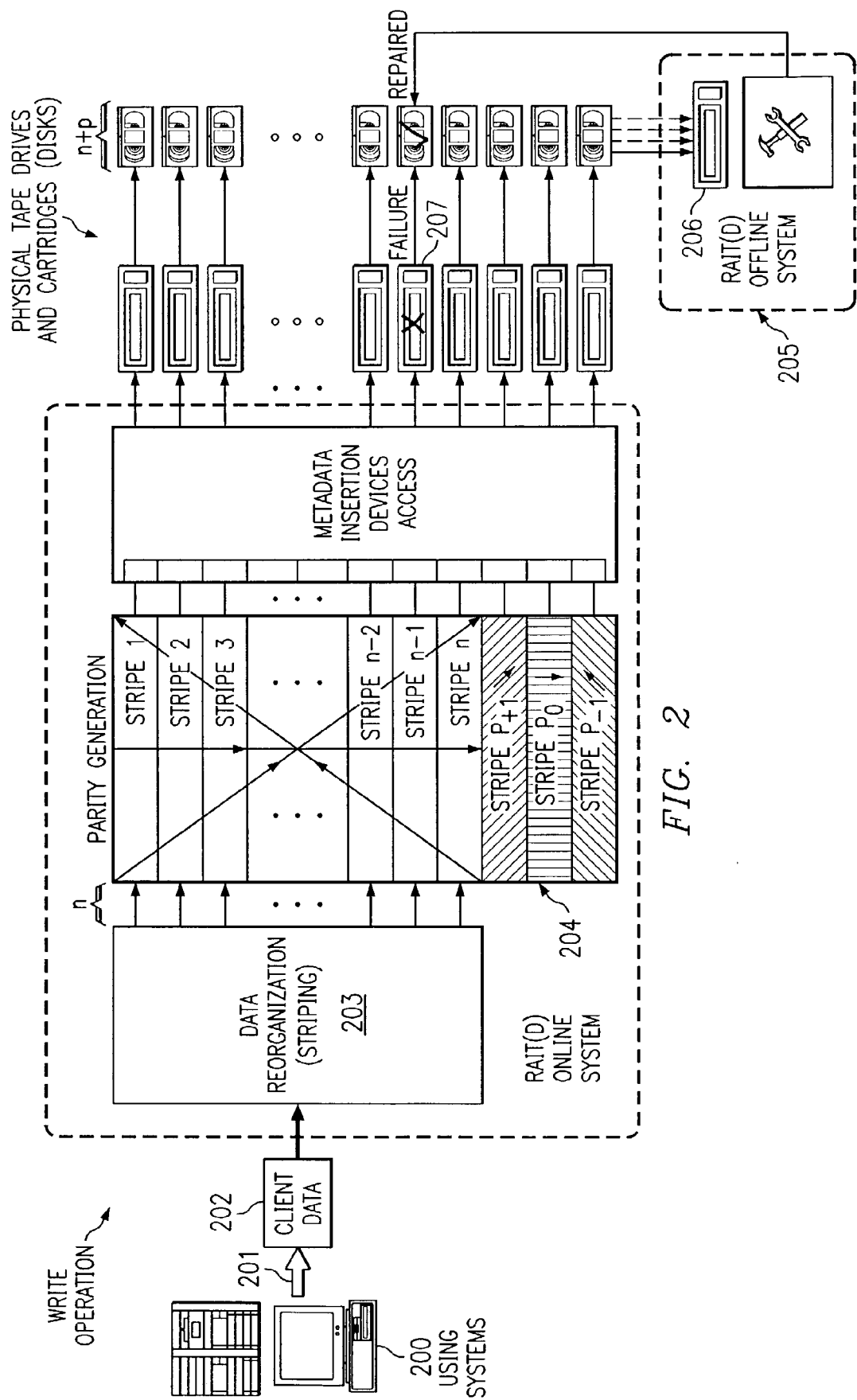
FIG. 2 depicts a schematic diagram illustrating a RAIT (D) write operation in accordance with the present invention.

Referring to FIG. 2, a schematic diagram illustrating a RAIT(D) write operation is depicted in accordance with the present invention. The first part of implementing the present invention is establishing the level of performance and redundancy required for writing the data supplied by the using system. For a virtual tape, this can be done in relation to the mount or with respect to a file command. For a disk, it can be done relative to extent boundaries on the virtual disk. For write operations, the specification of performance and redundancy is supplied externally across a using interface (201).

With these parameters set, when data blocks 202 to be written to storage are received from a using system 200, the data is organized into n streams 203, where n is the number of parallel operations required for performance. The n streams are then cascaded into the parity generation/data reconstruction system 204 (which can be hardware or software, described in more detail below) in order to create p units of parity in such a manner that the memory holding the data is used in burst fashion. This is done on a section-by-section basis, where the sections that are processed together for parity can then be handed off to other functions for further analysis and processing before being written to the device. The various possible data manipulations can be executed in parallel on different sets of data sections. This process is called a pipeline.

The second part of the solution is to allow the n stripes or the p parity to be modified at arbitrary points in the processing stream. This modification is performed by parameter control at the interface to the parity creation system. The using system 200 can set the parameter control via any type of link, which may include the same link 201 used for transferring client data 202, or another link. Unless instructed otherwise, the system uses the same set of parameters as for the last operation. However, the interface allows a new set of parameters for every requested operation. At the end of n sections of data being sent to the parity generation/data recreation system 204, simultaneously all p sets of parity are available to be written to storage.

The third part of the invention is to allow the parity generation/data reconstruction 204 system to be implemented in an off line set of resources 205 in such a manner that less than n+p devices are required to do the data manipulations. For example, in the extreme, only one input tape drive 206 might be required to allow the data to be manipulated. This allows a stream initially written at n+p to be arbitrarily modified (for example to (n−1)+p when one of the physical devices 207 fails during the operation) and then reconstructed back to n+p offline, thus avoiding the use of critical system resources for the reconstruction.

The advantage of this approach is a high throughput and process completed, even if some of the physical resources (up to p) fail during the operation. In such a case, failures can be repaired offline. Additional advantages include Pipelining and re-blocking at low memory cost. The client host can also have a multiplexed or parallel data stream.

Figure 3:
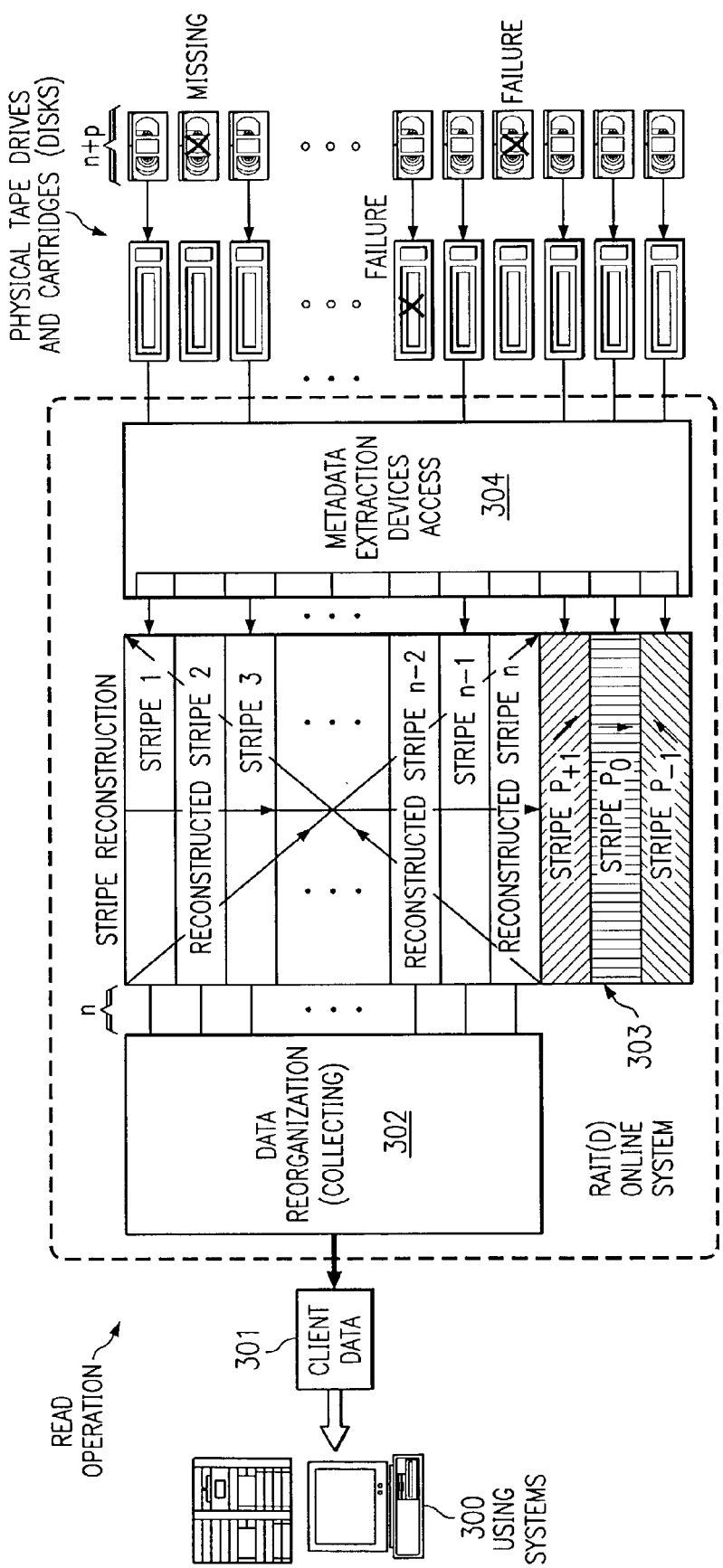
FIG. 3 depicts a schematic diagram illustrating a RAIT (D) read operation in accordance with the present invention.

Referring to FIG. 3, a schematic diagram illustrating a RAIT(D) read operation is depicted in accordance with the present invention. Similar to the write process, the process begins by establishing the level of performance and redundancy available for reading, and presenting it to the using system. As stated above, for a virtual tape this can be done in relation to the mount or a file command, and for disk, it can be done relative to extent boundaries on the virtual disk. For read operations, the specification is retrieved from metadata 304 stored in association with the data.

When n sets of data and/or parity are given to the parity generation/data reconstruction system 303 for a read operation, and the rest of the data (or parity) is created in real time. Data reorganization component 302 collects all the read data stripes (not the parity stripes, which are used only for reconstructing missing data stripes), plus the reconstructed ones (up to p), and reorganizes them in order to send the original client data 301 back to the using system 300.

The read operation implemented with the present invention has the advantage of recovering customer data even if some physical resources (up to p) are not mounted, not available, or fail during the operation.

Referring to FIGS. 4A and 4B, diagrams illustrating a method of parity generation are depicted in accordance with the present invention. FIGS. 4A and 4B depict the "heavy" method of parity generation. As explained above, the original customer data block is split into n data stripes $S_1$–$S_n$. The first step in parity generation is to read and store the full customer data block in the n stripes. In FIG. 4A, the data on stripes $S_1$–$S_3$ has been read and stored. In stripe $S_4$, only the first ten sections have been recorded, with section $S_{4,11}$ 401 receiving incoming data. Stripes $S_5$–$S_n$ have not yet been read and stored.

After the data on stripes $S_1$–$S_n$ have been read and stored, p parity units are computed from the data, as depicted in FIG. 4B. In the present example, there are three parity stripes: a positive diagonal parity $P_{+1}$, a straight parity $P_0$, and a negative diagonal parity $P_{-1}$. The number of parities can be more or less. A p value of three is a good tradeoff for values of n up to 12. For larger number of stripes (e.g., 15, 20), the optimal values of p will probably be higher (e.g., 4, 5) in order to ensure the same level or reliability.

Each parity stripe $P_x$ is generated given its slope x: $P_0$, $P_1$, $P_{-1}$, $P_2$, $P_{-2}$, etc. The parity calculation is:

$$P_{x,y} = \sum_{i=1}^{N} S_{i,y+x*(i-\max(x*n/|x|;1)}$$

where Σ stands for a sum of XOR operation.

For data indexed at a position y, the parity calculation gives:
For the straight parity (the vertical column in FIG. 4B):
$P_{0,y}=S_{1,y} \oplus S_{2,y} \oplus \ldots \oplus S_{n,y}$
For the first positive parity (the positive diagonal of FIG. 4B): $P_{+1,y}=S_{1,y+1-n} \oplus S_{2,y+2-n} \oplus \ldots \oplus S_{n,y}$
For the first negative parity (the negative diagonal of FIG. 4B): $P_{-1,y}=S_{1,y} \oplus S_{2,y-1} \oplus \ldots \oplus S_{n,y-n+1}$
Etc.

where $\oplus$ stands for a XOR operation.

The advantage of the heavy parity method is that it uses a simple fixed structure of pointers for computing parity stripes. The disadvantage is the need to store and handle the incoming data stripes, plus the parity stripes.

Figure 5A:
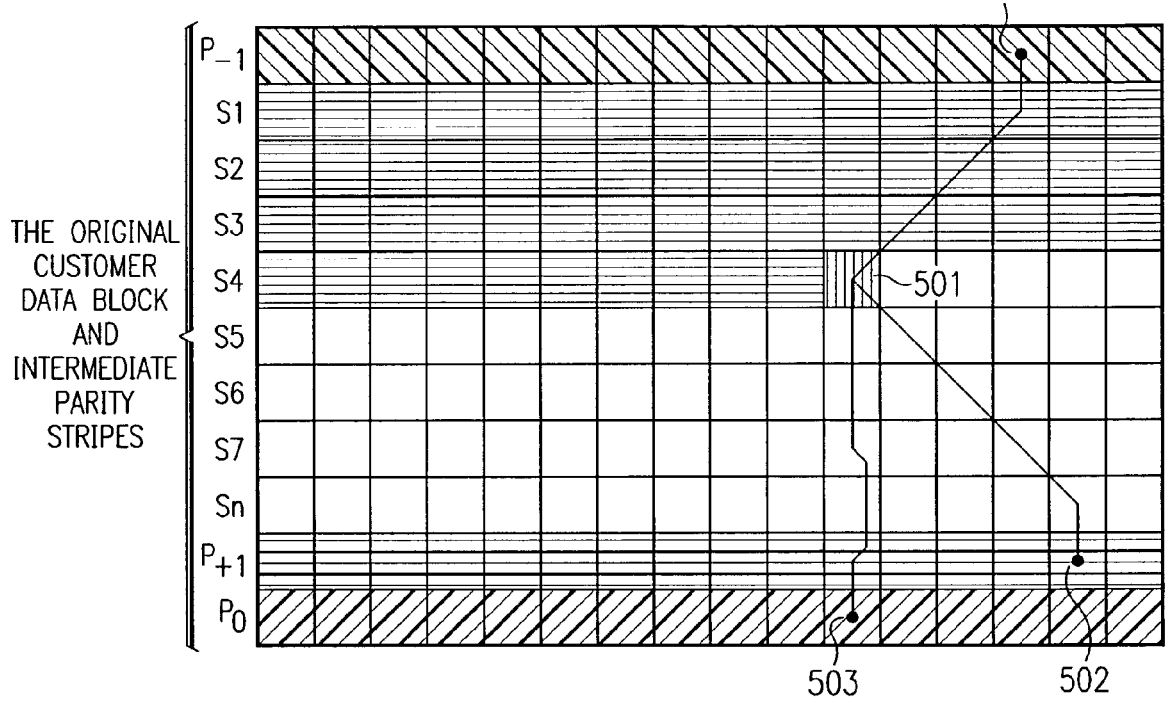
FIGS. 5A and 5B depict diagrams illustrating an alternate method of parity generation in accordance with a preferred embodiment of the present invention.
Figure 5B:
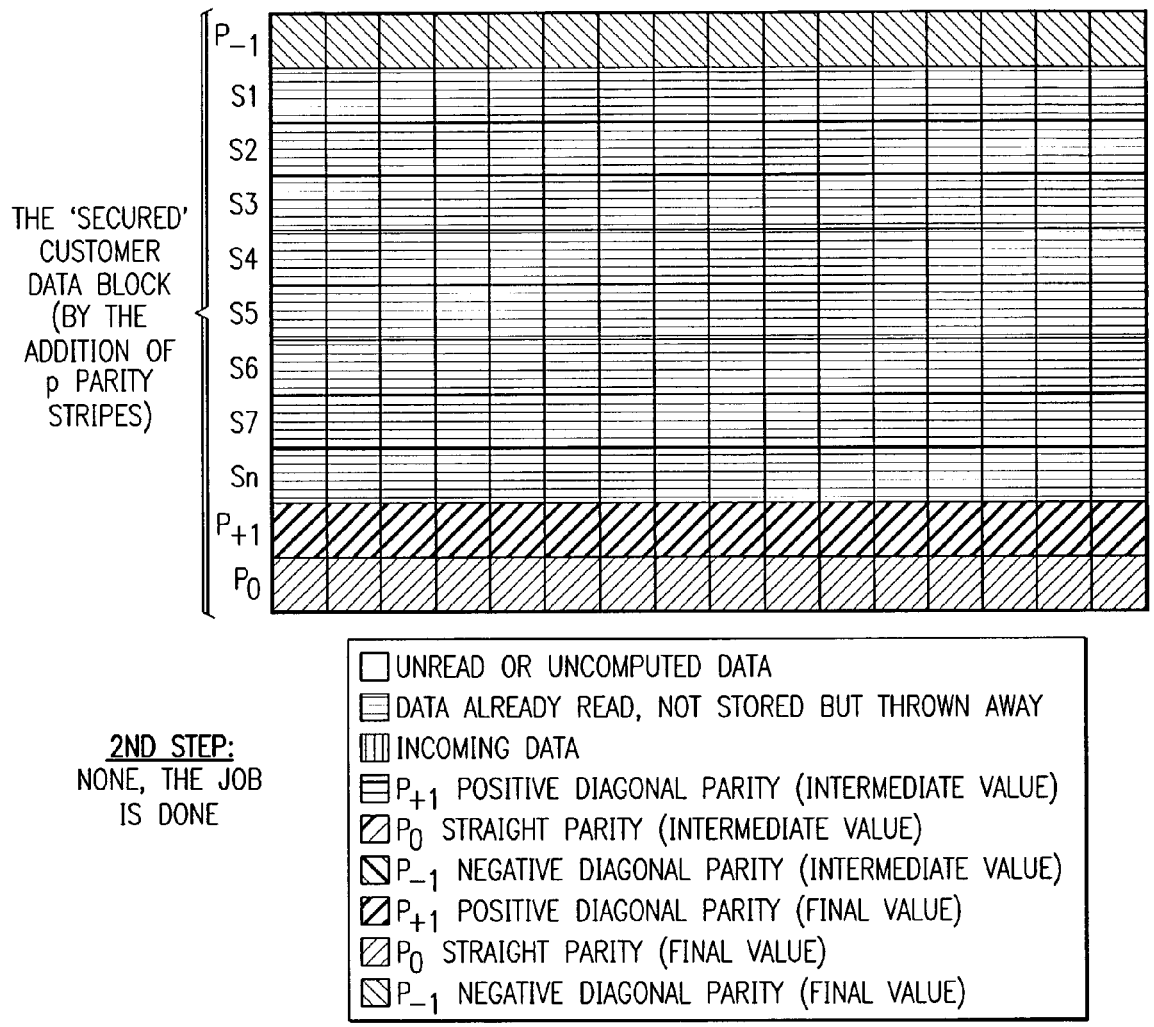

Referring to FIGS. 5A and 5B, diagrams illustrating an alternate method of parity generation are depicted in accordance with a preferred embodiment of the present invention. FIGS. 5A and 5B depict the "light" method of parity generation. As with the previous method, the data block is split into n stripes $S_1$–$S_n$. However, unlike the heavy method, the data is not physically stored after it is read.

Instead, the data is read and thrown away. The data is read stripe by stripe, while intermediate parity values are computed. Again, there are positive diagonal $P_{+1}$, straight $P_0$, and negative diagonal parities $P_{-1}$. In FIG. 5A, incoming data is being read from the 11$^{th}$ section $S_{4,11}$ 501 in data stripe $S_4$, and intermediate parity values are being computed and stored to the 15$^{th}$ section $P_{+1,15}$ 502 of parity stripe $P_{+1}$, the 11$^{th}$ section $P_{0,11}$ 503 of parity stripe $P_0$, and the 14$^{th}$ section $P_{-1,14}$ 504 of parity stripe $P_{-1}$.

The XOR operation is commutative. The following explanation takes the case of the straight parity, $P_0$ since it is the easiest example.

As indicated above, for data indexed at a position y:
$P_{0,y}=S_{1,y} \oplus S_{2,y} \oplus \ldots \oplus S_{n,y}$.

This can also be written as:
$P_{0,y}=(\ldots (S_{1,y} \oplus S_{2,y}) \oplus \ldots \oplus S_{n,y})$ where $P^1_{0,y}=S_{1,y} \oplus S_{2,y}$ is the first intermediate value. The second intermediate value is $P^2_{0,y}=P^1_{0,y} \oplus S_{3,y}$, and so on, up to the final value $P^{n-1}_{0,y}=P^{n-2}_{0,y} \oplus S_{n,y}$ which is equal to $P_{0,y}$.

FIG. 5B depicts the completed parity stripes $P_{+1}$, $P_0$, and $P_{-1}$ securing data stripes $S_1$–$S_n$. No further calculations are required after the intermediate parity is calculated during the initial read of the data stripes $S_1$–$S_n$. The intermediate parity values become the final parity values securing the customer data block.

This light method of parity generation has the advantages of needing to store/handle only the p iteratively computed parity stripes and requiring only one step. The disadvantage of this approach is the need for an adaptable matrix of pointers for computing parity stripes.

Figure 6A:
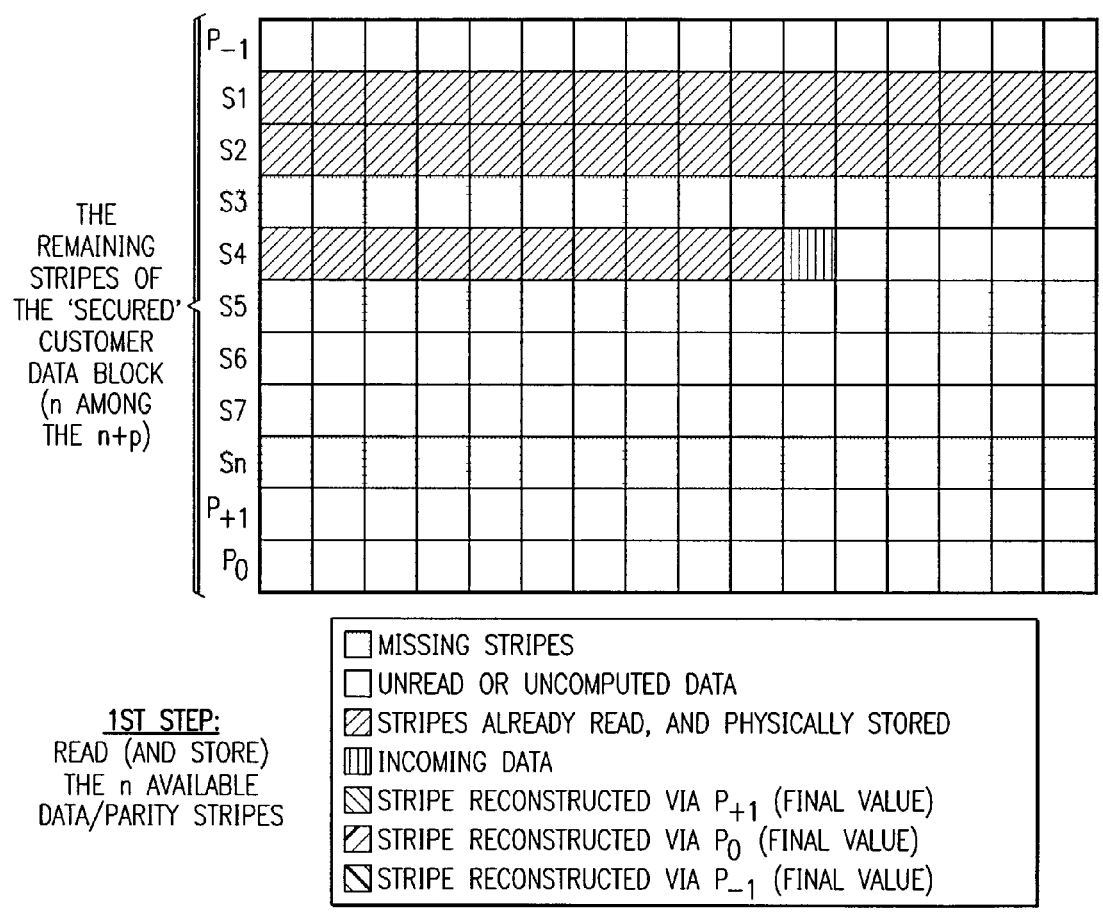
FIGS. 6A and 6B depict diagrams illustrating a method of data stripe reconstruction in accordance with the present invention.
Figure 6B:
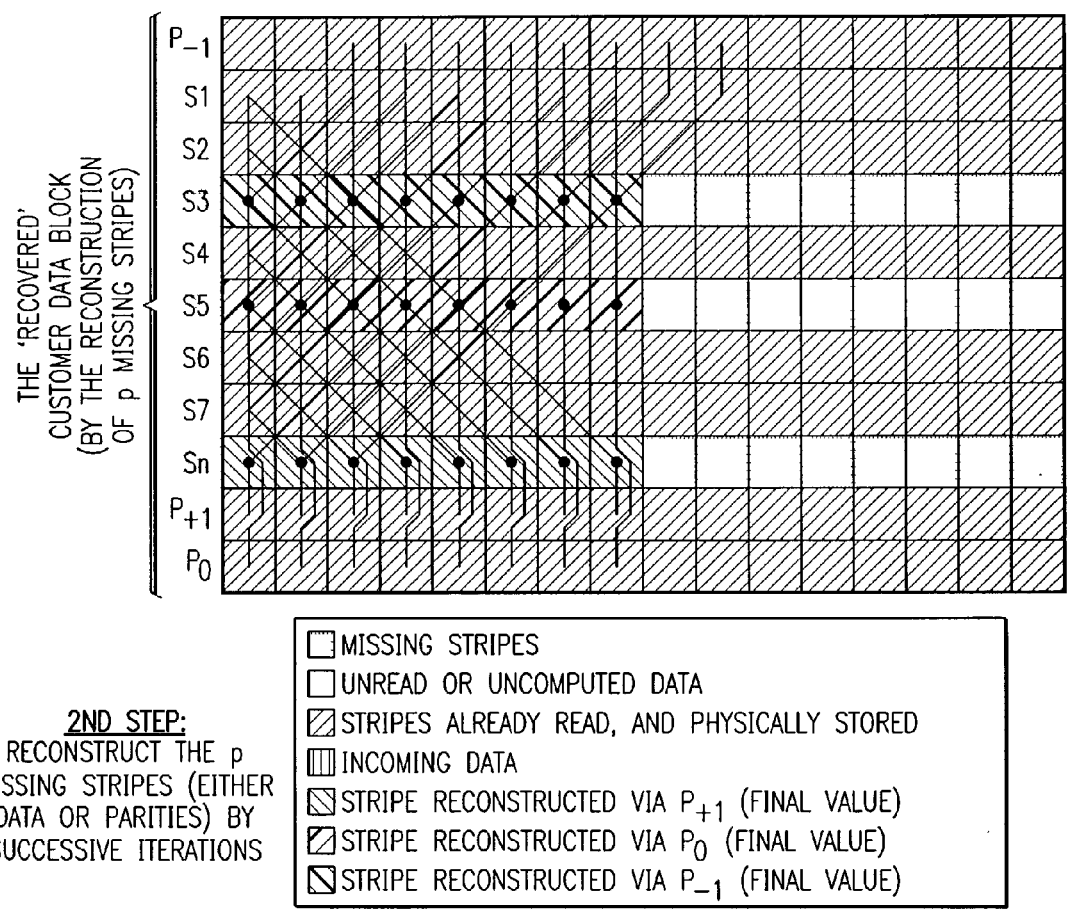

Referring now to FIGS. 6A and 6B, diagrams illustrating a method of data stripe reconstruction are depicted in accordance with the present invention. The method depicted is the "heavy" method of stripe reconstruction. As depicted in FIG. 6A, data stripes $S_3$, $S_5$, and $S_n$ are missing, and the data on those stripes is considered lost. To recover the lost data, the remaining data is read and stored from the available data stripes $S_1$–$S_2$, $S_4$, and $S_6$–$S_7$, in addition to the parity stripes $P_{+1}$, $P_0$, and $P_{-1}$.

After the available data and parity have been read and stored, the missing data stripes $S_3$, $S_5$, and $S_n$ are reconstructed by successive iterations, as depicted in FIG. 6B.

The heavy method of stripe reconstruction has the advantage of using a fixed structure of pointers for computing the reconstructed data stripes. The disadvantage of this method is the need to store/handle all of the available data and parity stripes, plus the missing stripes reconstructed later during the second step.

For parity generation, the differences between the "heavy" method and the "light" one (which computes the parities iteratively), lead to small impacts on the matrix of pointers. However, this is not the case when considering stripe reconstruction.

In the "heavy" method, each block of memory (from either the n data stripes or the p parity stripes) has a "fixed" position related to other blocks. For example, during the parity generation process, the "$S_{2,y}$" block is implied in computation of $P_{0,y}$, $P_{+1,y+n-2}$, $P_{-1,y+1}$, etc. Therefore, during the data reconstruction process, the same "$S_{2,y}$" block could be repaired by members of:

$P_{0,y}$ ($P_{0,y}$ plus $S_{1,y}$, $S_{3,y}$, $S_{4,y}$, ... $S_{n,y}$)

$P_{+1,y+n-2}$ ($P_{+1,y+n-2}$ plus $S_{1,y-1}$, $S_{3,y+1}$, $S_{4,y+2}$ ... $S_{n,y+n-2}$)

or $P_{-1,y+1}$ ($P_{-1,y+1}$ plus $S_{1,y+1}$, $S_{3,y-1}$, $S_{4,y-2}$ ... $S_{n,y-n+2}$)

and so on (if there are more parities with higher slopes).

In the "light" method, only the p iteratively computed stripes (data and/or parity) are stored. As they can represent any combination among the n+p, their blocks of memory no longer have "fixed" positions related to other ones. In order to mitigate this, the matrix of pointers is adaptable and sets the relations across blocks of memory accordingly to which stripes (data or parity) are being reconstructed/generated.

Figure 7A:
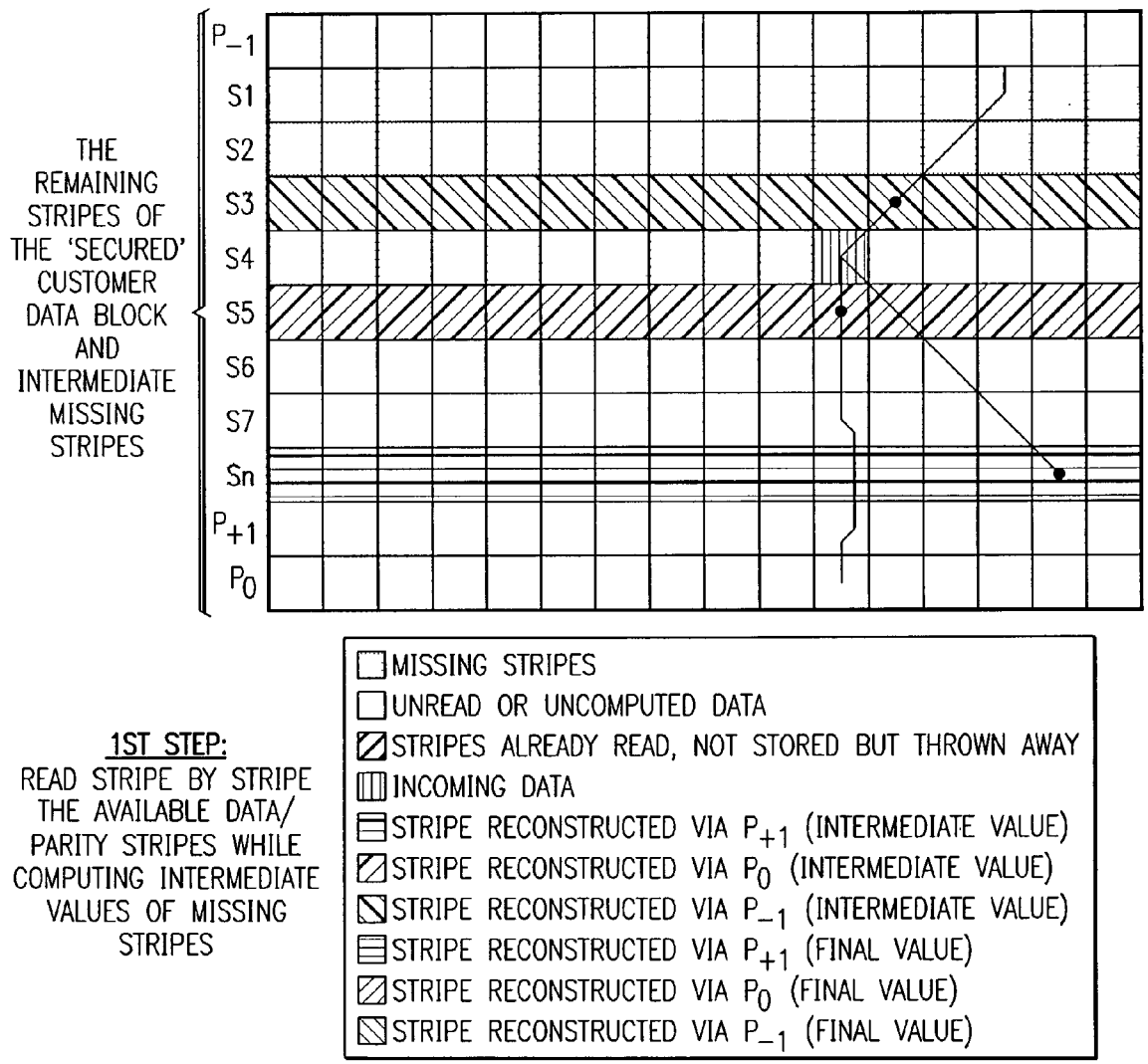

Referring now to FIGS. 7A and 7B, diagrams illustrating an alternate method of data stripe reconstruction are depicted in accordance with a preferred embodiment of the present invention. This alternate embodiment uses the "light" method for stripe reconstruction. As in FIG. 6A, the missing stripes in FIG. 7A are $S_3$, $S_5$, and $S_n$. Rather than reading and storing all of the remaining data and parity stripes, the stripes are read one by one, with the intermediate values of the missing stripes computed along the way. Because the intermediate values are being computed as the available data is read, there is no need to store the read data, so it is discarded.

When several stripes are reconstructed, they are iteratively computed while reading available data/parity stripes, as depicted in FIG. 7A. However, as their own values are linked together, a second pass, shown in FIG. 7B is done in order to get the final values. Reconstruction is finished by propagating a correction, starting from the lowest memory blocks (y==1) to the highest ones (y>>1), first recovering the data via the diagonal parities, then via the straight parity.

In FIGS. 7A and 7B, stripes $S_3$, $S_5$, and $S_n$ are missing and will be reconstructed. The lowest index one ($S_3$) will be reconstructed via the first negative parity $P_{-1}$, the highest index one ($S_n$) will be reconstructed via the first positive parity $P_{+1}$ and the middle index one (alias $S_5$) will be reconstructed via the Straight parity $P_0$.

The intermediate values computed in the first step of "light" stripe reconstruction are:

$S'_{3,y}=P_{-1,y+2} \oplus S_{1,y+2} \oplus S_{2,y+1} \oplus S_{4,y-1} \oplus \cancel{S_{5,y-2}} \oplus S_{6,y-3} \oplus S_{n-1,y-n+4} \oplus \cancel{S_{n,y-n+5}}$ (Stripes $S_5$ and $S_n$ are missing)

$S'_{n,y}=P_{+1,y} \oplus S_{1,y-n+1} \oplus S_{2,y-n+2} \oplus \cancel{S_{3,y-n+3}} \oplus S_{4,y-n+4} \oplus \cancel{S_{5,y-2}} \oplus S_{6,y-n+6} \oplus S_{n-1,y-1}$ (Stripes $S_3$ and $S_5$ are missing)

$S'_{5,y}=P_{0,y} \oplus S_{1,y} \oplus S_{2,y} \oplus \cancel{S_{3,y}} \oplus S_{4,y} \oplus S_{4,y} \oplus S_{6,y} \oplus S_{n-1,y} \oplus \cancel{S_{n,y}}$ (Stripes $S_3$ and $S_n$ are missing)

The second step in the "light" reconstruction method is to determine the final values by propagating the correction from the lowest memory blocks (y==1) to the highest ones (y>>1).

Starting with y==1, the first values recovered are:

$S_{n,1}=S'_{n,y}$ and $S'_{3,1}=S'_{3,1} \oplus S_{1,2 \oplus S2,3}$ followed by $S_{5,1}=S'_{5,1} \oplus S_{3,1} \oplus S_{n,y}$ This is continued until reaching and recovering the highest memory block (y>>1).

The advantages of using the light method of stripe reconstruction are the need to store/handle only the iteratively reconstructed stripes and the simplification of the second step. The disadvantage of this method is the need for an adaptable matrix of pointers for computing the missing stripes.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for generating parity in a data storage system, the method comprising the steps of:
    organizing an incoming data block into a specified number of data stripes;
    cascading the data stripes into a parity creation mechanism; and
    creating a specified number of parity stripes based on the data stripes, wherein the number of parity stripes is independent of the size of the data block,
    wherein the data stripes and the parity stripes can be modified at arbitrary points in the method using a parameter control at an interface to the parity creation mechanism.

2. The method according to claim 1, wherein the interface allows a new set of parameters for every requested operation.

3. A method for generating parity in a data storage system, the method comprising the steps of:
    organizing an incoming data block into a specified number of data stripes;
    cascading the data stripes into a parity creation mechanism; and
    creating a specified number of parity stripes based on the data stripes, wherein the number of parity stripes in independent of the size of the data block, wherein the step of creating the parity stripes further comprises:
    reading the data stripes one at a time, wherein the data is discarded without being physically stored after it is read;
    iteratively computing each parity stripe as each data stripe is read, using an adaptable matrix of pointers; and
    storing the parity stripes.

4. A method for generating parity in a data storage system, the method comprising the steps of:
    organizing an incoming data block into a specified number of data stripes;
    cascading the data stripes into a parity creation mechanism;
    creating a specified number of parity stripes based on the data stripes, wherein the number of parity stripes is independent of the size of the data block;
    reading available data stripes and available parity stripes one at a time, wherein the data and parity are discarded without being physically stored after it is read:
    iteratively reconstruction intermediate values for each lost stripe as each available data stripe and available parity stripe is read, using an adaptable matrix of pointers;
    determining values for the reconstructed stripes by propagating corrections for the intermediate values; and
    storing the final values of the reconstructed stripes.

5. A computer program product in a computer readable medium for generating parity in a data storage system, the computer program product comprising:
    first instructions for organizing an incoming data block into a specified number of data stripes;
    second instructions for cascading the data stripes into a parity creation mechanism; and
    third instructions for creating a specified number of parity stripes based on the data stripes, wherein the number of parity stripes is independent of the size of the incoming data block,
    wherein the data stripes and the parity stripes can be modified at arbitrary points in the method using a parameter control at an interface to the parity creation mechanism.

6. The computer program product of claim 5, wherein the interface allows a new set of parameters for every requested operation.

7. A computer program product in a computer readable medium for generating parity in a data storage system, the computer program product comprising:
    first instructions for organizing an incoming data block into a specified number of data stripes;
    second instructions for cascading the data stripes into a parity creation mechanism; and
    third instructions for creating a specified number of parity stripes based on the data stripes, wherein the number of parity stripes is independent of the size of the incoming data block;
    fourth instructions for reading available data stripes and available parity stripes one at a time, wherein the data and parity are discarded without being physically stored after it is read;
    fifth instructions for iteratively reconstruction intermediate values for each lost stripe as each available data stripe and available parity stripe is read, using an adaptable matrix of pointers;
    sixth instructions for determining final values for the reconstructed stripes by propagating corrections for the intermediate values; and
    seventh instructions for storing the final values of the reconstructed stripes.

* * * * *